(12) United States Patent
Loeb et al.

(10) Patent No.: US 7,729,709 B1
(45) Date of Patent: Jun. 1, 2010

(54) LOCATION DEPENDENT COMMERCIAL MESSAGING

(75) Inventors: Michael R. Loeb, New York, NY (US); Edward J McCabe, Yonkers, NY (US)

(73) Assignee: Loeb Enterprises, LLC., New York, NY (US)

( * ) Notice: Subject to any disclaimer, the term of this patent is extended or adjusted under 35 U.S.C. 154(b) by 773 days.

(21) Appl. No.: 11/483,932

(22) Filed: Jul. 10, 2006

(51) Int. Cl.
*H04H 60/21* (2008.01)
(52) U.S. Cl. .................................. 455/456.3; 455/2.01
(58) Field of Classification Search ................ 455/2.01, 455/456.3
See application file for complete search history.

(56) References Cited

U.S. PATENT DOCUMENTS

| 6,377,793 | B1 | 4/2002 | Jenkins |
| 6,480,713 | B2 | 11/2002 | Jenkins |
| 6,681,107 | B2 | 1/2004 | Jenkins et al. |
| 2002/0040352 | A1* | 4/2002 | McCormick .................. 705/80 |
| 2004/0192258 | A1* | 9/2004 | Atkin et al. .............. 455/412.1 |

\* cited by examiner

*Primary Examiner*—Nick Corsaro
*Assistant Examiner*—Amanuel Lebassi

(57) ABSTRACT

A system and method is disclosed for promoting offered products and services to a plurality of mobile device users. The method generally comprises the steps of generating at least one general broadcast message directed to commercial offers of at least one provider (i.e., retailer) of the offered products and services. The general broadcast message is preferably broadcast from a central server over a prescribed geographic area. Responses from end users to the broadcast message are monitored at the central server to create profile information of the responding users for use in qualifying business relationships with the providers of said products and services. The responses may be further utilized to construct a market directed to inducing the providers of the offered products and services to purchase broadcast message blocks for future promotions. Establishment of such a market includes the establishment of pricing criteria based on user response rate statistics.

20 Claims, 2 Drawing Sheets

LOCATION DEPENDENT COMMERCIAL MESSAGING

CROSS-REFERENCE TO RELATED INVENTIONS

Figure 1:
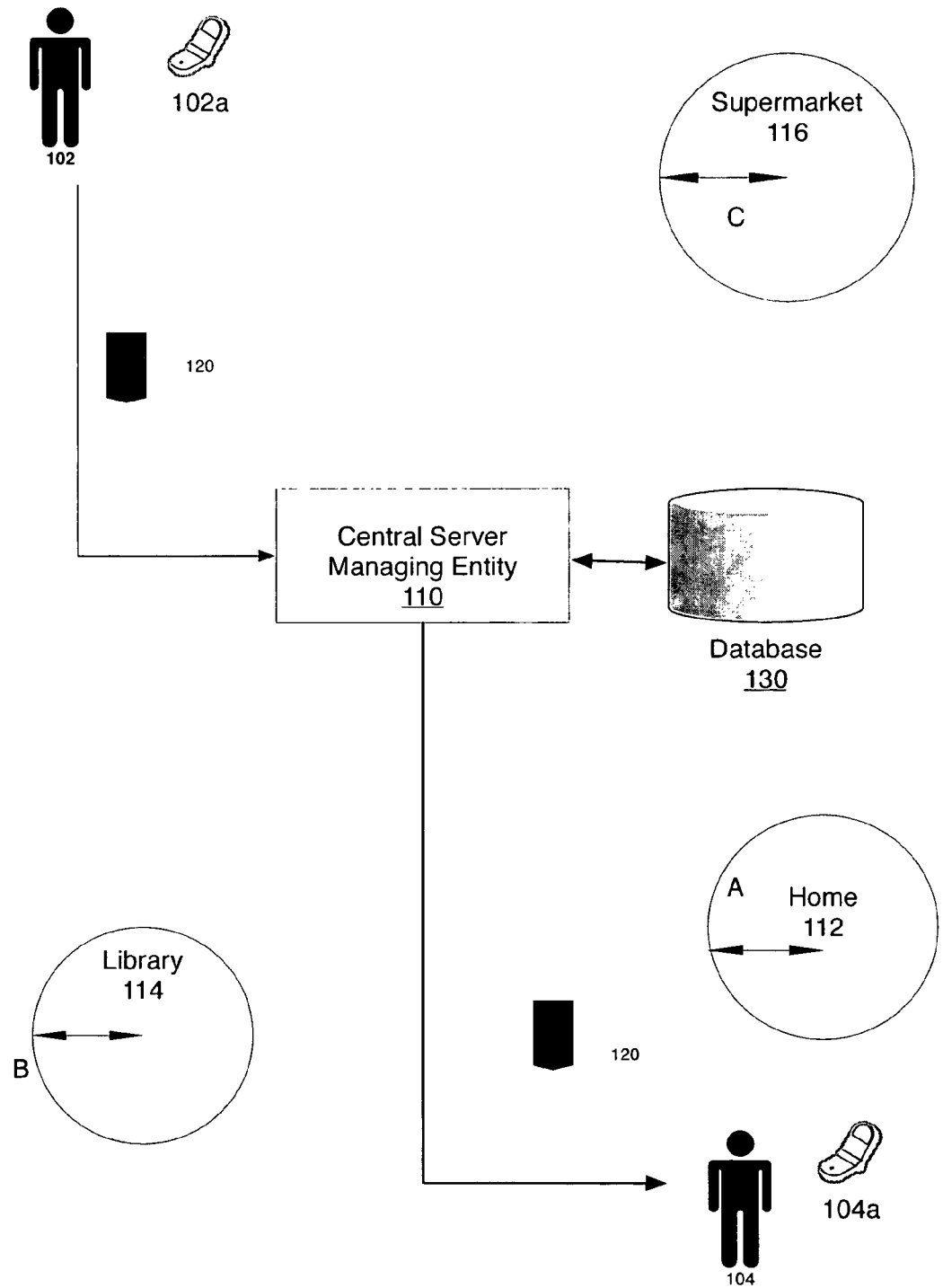

This application is related to co-pending U.S. patent application Ser. No. 11/483,994 filed on same date herewith, entitled "Location Dependent Non-commercial Messaging", which application is incorporated herein by reference in its entirety.

FIELD OF THE INVENTION

The present invention relates generally to the field of mobile wireless communication systems and more particularly to a method and system for promoting commercial products and services in dependence on a user's geographic location.

BACKGROUND OF THE INVENTION

Wireless communication devices have recently evolved from a technology used by an elite segment of the population to a technology that is used by the masses. Worldwide, the number of wireless communication device users has reached a staggering number and is growing all of the time. In the near future, it is envisioned that almost everyone will own or use some sort of wireless communication device that is capable of performing a variety of functions. One service that has grown to become an immensely popular, convenient form of communication between mobile telephone devices is the Short Message Service (SMS), which was first introduced by European wireless network operators in 1991. SMS allows subscribers to easily send and receive text messages via wireless handsets. Although specifications and industry standards related to SMS are constantly evolving and being modified, SMS messages have traditionally been used to convey readable text information, where the text can include any combination of characters that can be entered via a keypad or keyboard. The popularity of the SMS service stems in part from its ease of use. Specifically, short messages typed through a cellular keypad are delivered instantly to a recipient, who retains a record of the message on their portable device and can respond in kind at their leisure. Such messages serve not only to distribute important information (e.g., Where are you?, What time are we meeting?), but also less consequential "small talk" that does not warrant a phone call.

SMS delivery service provides a mechanism for transmitting messages to and from SMS capable terminals (e.g., wireless handsets, personal computers, etc.) via the signaling component of the wireless communication network. With particular regard to the sending and receiving of SMS messages by a wireless handset, a signaling network provides the transport facilities necessary to communicate short messages between a store-and-forward network element, known as a short message service center (SMSC), and a wireless handset. In contrast to earlier text message transmission services, such as alphanumeric paging, SMS technology is designed to provide guaranteed delivery of an SMS message to a destination. That is, if a temporary network failure, or the unavailability of a message recipient prohibits the immediate delivery of an SMS message, then the SMS message is stored in the network (i.e., at an SMSC) until the destination/intended message recipient becomes available. Another of the key and distinguishing characteristics of SMS service, with respect to previously available message communication services, is that an active mobile handset is able to send or receive a short message at any time, regardless of whether or not a voice or data call is in progress.

Despite its myriad advantages over previously available message communication services and undeniable convenience, one drawback of conventional SMS messaging is when a message is delivered as a reminder (e.g., "pick up milk", "prepare dinner") the instantaneous nature of the text message might not be ideal. That is, in certain instances, it may be inappropriate, inconvenient and/or undesirable to instantaneously transmit such messages. Instead, it may be more convenient to enter a text message and delay delivery until a later point. Further, it might under some circumstances be more convenient, or indeed novel and fun, to assign geographic parameters to the delivery of a text message. Thus, a message would only be delivered to its intended recipients at the point that they enter within a certain geographic area.

U.S. Pat. No. 6,377,793 discloses a method of accessing and leaving messages at coordinate way points. In accordance with the described method, when a specific location is reached where a person desires to leave a personal message, they push a button on their communication device to record the physical location at that instant in time. Alternatively, this can be affected by a voice command to "record location" or other syntax affecting the same result. By performing this command, the location is then sent to the network or the network is requested to record the location depending upon whether the positioning is performed by the device or by the network. In either case, it is appreciated that the user must be physically present at the specific location to leave a message.

Therefore, a need exists for an improved messaging system that overcomes the afore-mentioned drawbacks of the prior art.

SUMMARY OF THE INVENTION

The present invention provides new and improved methods and systems for delivering location dependent messaging. In an embodiment, short text messages, delivered in accordance with the SMS protocol, are transmitted to intended recipients when it is determined that the intended recipient has entered a pre-defined geographic location. In the described embodiment, the invention provides systems and methods that leverage the current capabilities of the short message service (SMS) and location tracking of mobile devices to deliver the location dependent messaging.

In accordance with one embodiment of the present invention, there are provided methods and systems for forwarding location dependent messages from a first user's mobile cellular device to a second user's mobile cellular device, the method comprising: generating, at a central server, at least one general broadcast message directed to a commercial offer of at least one provider the offered products and services, transmitting, from the central server, the at least one general broadcast message over a prescribed geographic area, and monitoring responses to the at least one general broadcast message, at the central server, from responding users, the monitoring allowing for an understanding of the responding users preferences.

DESCRIPTION OF THE DRAWING FIGURES

Figure 2:
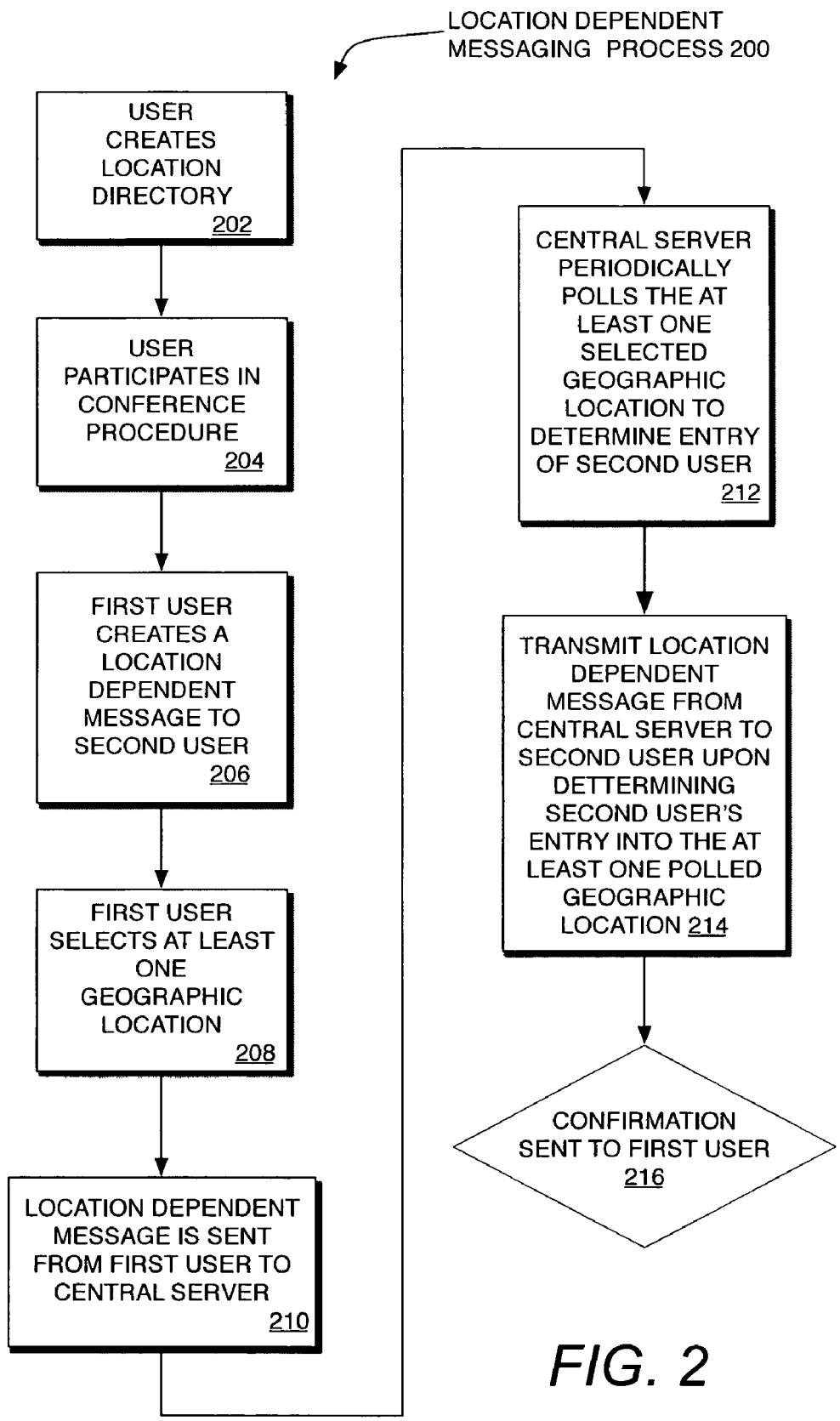

These and other objects, features and advantages of the present invention will be apparent from a consideration of the following Detailed Description of the invention, when considered in conjunction with the drawing Figures, in which:

FIG. 1 is a block diagram of a system in accordance with the present invention; and FIG. 2 is a flow chart showing a process in accordance with the present invention.

DETAILED DESCRIPTION

There is provided herein new and improved methods and systems for forwarding location dependent short text messages to intended recipients. In the described embodiment, the invention provides systems and methods that leverage the current capabilities of the short message service (SMS) and location tracking of mobile devices. Current cellular telephone systems provide various forms of instant messaging capability also useful in transmitting and receiving the queries, advertisements, and the like used in the present method. It should be understood that while messaging in accordance with the Short Message Service (SMS) protocol is a presently preferred method, other forms of messaging are also well within contemplation of the present invention, the only requirement being that the message is capable of being communicated when the recipient is within a determinable location. Exemplary, alternative forms of messaging include, but are not limited to e-mail, telephone, Simple Mail Transfer Protocol (SMTP), web browsing e-mail, voice mail, and Multimedia Messaging Services (MMS).

Given the state of wireless technology and location tracking such as GPS and triangulation, the present inventors have determined that it would be particularly desirable to utilize a location dependent messaging system in which messages are delivered to their intended recipients dependent upon an intended recipient's entry within a pre-defined geographic area as specified by the sender. An intended recipient is provided with capabilities for receiving particular types of messages, and an intermediary management entity, operating a dedicated server, accepts and processes those messages forwarded by a sender.

The invention is suitable for use with a wide variety of applications, including, but not limited to, games, restaurant recommendations, delivery of advertisement e-mails and solicitations to receptive parties interested in finding out about local events.

With reference now to FIG. 1, there is shown and described a simplified SMS enabled communication system 100 in which the present invention may be utilized. The SMS system 100 comprises a plurality of cellular devices including a capability for determining the cellular device's location via signal triangulation methods or other methods. Two devices 102a, 102b are shown for ease of explanation. System 100 further comprises a central server 106, a central server managing entity 110 for performing a number of functions including, receiving and validating location dependent short text messages transmitted from various participants 102, 104 in the network, polling the geographic locations of one or more recipients specified in the location dependent short text messages to determine if an intended recipient has entered the geographic location specified in the message, and transmitting those validated location dependent short text messages to intended recipients in the case where the central server managing entity 110 determines that an intended recipient has entered the geographic location specified in the message.

The cellular devices 102a, 104a, allows a person 102, 104 having the mobile device 102a, 104a to receive position location information. In the described embodiments, a cell phone device is used for illustration purposes, but the device could be a PDA (Personal Digital Assistants), computer, walkie talkie, notebook computer, pager or any other device capable of receiving the transmitted message It should be appreciated that a pre-requisite to carrying out location dependent SMS messaging is the geographic location of a recipient be determinable relative to a desired location. In the illustrated embodiment, this is done by having each mobile device 102a, 104a equipped with means for determining the mobile device's location. Determining a mobile device's location is well understood in the art and can be done through a number of means including GPS, assisted GPS, or RF triangulation of the signal from the cell sites serving the mobile device or by simply encountering an 802.11 or Bluetooth wireless access point, which effectively positions the device. Of course many other methods are known for recognizing the location of a recipient, for example rfid tagging, optical face or body characteristic recognition and others as will be known to the reader.

With continued reference to FIG. 1, by way of example, three geographic locations are shown for illustrating location dependent short text messaging according to invention principles. The three exemplary geographic locations include a home 112, library 114 and a supermarket 116. As will be described in greater detail below, the system 100 is operable to route a location dependent short text message 120 from the sender's mobile device 102a, via the central server 106, to an intended receiver's mobile device 104a contingent upon the intended receiver entering a prescribed radius surrounding a geographic location (e.g., radius A from home 112, radius B from the library 114, radius C from the supermarket 116, as shown in FIG. 1).

With reference now to FIG. 2, a method for forwarding location dependent short text messages to an intended recipient's GPS capable cellular phone based on the recipient's entry within a prescribed radius surrounding a pre-defined geographic location is described as follows.

At step 202, which is an optional step, a first user 102, at any point subsequent to purchasing a cellular phone 102a, may create a "location directory" and/or a "bookmark directory." A description of the construction of both the location directory and bookmark directory, according to one embodiment is described as follows. It should be appreciated that the creation of both the "location directory" and "bookmark directory" are optional. They are intended to facilitate location dependent short text messaging as taught herein, by providing means for quickly specifying a geographic location and radius (i.e., as provided by the location directory) as a short text message parameter and for quickly specifying both a geographic location and intended user (i.e., as provided by the bookmark directory) as a further short text message parameter.

Location Directory

As briefly discussed above, the first user 102, upon purchasing a GPS-enabled mobile cellular device 102a, the first user 102 (i.e., message sender) has the option of creating a "location directory" in a memory of the purchased device 102a. The location directory may be constructed via a customized application supported by the GPS-enabled mobile cellular device 102a. The location directory is preferably constructed as a plurality of records in a table, whereby each record comprises two fields, a geographic location and a corresponding radius. The geographic location defines preferred locations for sending location dependent short text messages to intended receivers. The radius defines the circumscribed region around the geographic location inside of which an intended receiver will be identified upon entry.

One way of simultaneously specifying the geographic location and an intended user is to access a so-called "bookmark directory", as described in greater detail below and illustrated in Table II. Other methods for specifying a geographic location include, for example, the message sender directly inputting the GPS coordinates of the location in the GPS-enabled cellular phone 102a, the message sender inputting an address, the message sender accessing a website, via the GPS-enabled cellular phone 102a, that provides capabilities for defining geographic locations such as Map-quest™ or Google™, or others as will be known to the reader. Alternatively, a message sender may specify one or more geographic locations without the assistance of a GPS-enabled cellular telephone 102a. For example, the message sender may specify one or more geographic locations via a remote terminal connected to a network, such as the Internet, to access the central server 106 storing the "bookmark directory.

In light of the various options for defining the geographic location, it is understood that the creation of a location directory is an optional step.

Table I illustrates, by way of example, a typical location directory that a user may create on his or her GPS-enabled mobile cellular device 102a.

TABLE I (Location Directory: For Exemplary User ID - 1429583)

| GEOGRAPHIC LOCATION | RADIUS |
| --- | --- |
| Home | 20 yards |
| Bank | 10 yards |
| Library | 50 yards |
| Supermarket | 35 yards |
| Bowling Alley | 40 yards |
| Restaurant | 10 yards |

Book-Mark Directory

As briefly discussed above, the first user 102, upon purchasing a GPS-enabled mobile cellular device 102a, has the option of creating a bookmark in a memory of the purchased device 102a. The bookmark may be constructed via a customized application supported by the GPS-enabled mobile cellular device 102a. The bookmark is preferably constructed as a plurality of records in a table format wherein each record defines an association between a user preferred geographic location with an intended recipient for receiving the location dependent short text messages upon arriving within a prescribed distance at the location.

It is contemplated that a user may create such "bookmark" associations following the sending of a location dependent text message. A user, after selecting the recipient and a geographic parameter, for example from a previously constructed location directory, has the option of identifying those two parameters as a popular combination and thus deserving of a "bookmark" entry (e.g., "Home—Beth (wife)"). In the future, rather than having to select both user and geographic location separately, the sender might expeditiously reference the bookmark directory rather than having to separately reference both a phone-directory and location directory.

Table II illustrates, by way of example, a typical "bookmark directory" that a user may create on his or her mobile cellular device 102a.

TABLE II (Bookmark: User 1429583)

| GEOGRAPHIC LOCATION | ASSOCIATED USER |
| --- | --- |
| Home | Beth (wife) |
| Home | Bobby (child) |
| Home | Sandra (child) |
| Supermarket | Frances (maid) |
| Bowling Alley | Ted (friend) |
| Restaurant | Al (boss) |

At step 204, the user is provided with the option of participating in a confirmation procedure to allow the user to "link" his or her phone number with other users thereby establishing a network of pre-approved participants. A description of a confirmation procedure, according to one embodiment is described as follows.

Confirmation Procedure

In addition to creating a location directory, a user, upon purchasing a GPS-enabled cellular phone 102a, is provided with the option of performing a confirmation procedure (204) to allow the user to "link" his or her phone number with other users thereby establishing a network of pre-approved "linked" users or participants. This optional confirmation procedure provides a number of advantages. By establishing a network of pre-approved "linked" users, a user sending a geo-contingent message may receive a delivery confirmation of the message from a "linked" user receiving the message. A user may also utilize his or her GPS-enabled device to reference the location of linked users. Further, the confirmation procedure provides a degree of security by preventing unknown (i.e., non-linked) users from inferring another user's location by sending a geo-contingent text message and inferring the receiving user's location from a confirmation message.

In the event a user elects to participate in the confirmation procedure to allow other "linked" users to reference their location and receive confirmation of message delivery, the confirmation procedure requires that users comply with one of two alternative pre-requisites. Each user has the option of providing a list of contacts, defining other "linked" users to a service provider or management entity. The management entity 110 compares each submitted list and wherever two users name each other in their respective lists, a match is identified and the matching users are identified by the management entity 110 as being "linked" users. Alternatively, in lieu of establishing "linked" user lists, as described above, a user may attempt to establish a link in real-time by sending a confirmation request in the form of a message to another user, where the recipient can confirm, approve or deny the linkage. The confirmation message may also be included as part of the geo-contingent message.

In operation, whenever a location dependent short text message is sent from a sending party to a linked participant, that participant (i.e., intended message receiver) is provided with the option of approving or denying the linkage. In the case where the participant approves the linkage, each participant (i.e., sender and receiver) is permitted to trade location dependent short text messages with each other and the sending party is permitted to reference the receiving parties' geographic location by receiving a confirmation that their message has been delivered.

At step 206, the first user 102 (message sender) creates a location dependent short text message to a second user 104 (intended message receiver) within his or her network of pre-approved participants by selecting the second user 104 from among the network of pre-approved participants established in the confirmation procedure.

At step 208, upon selecting an approved participant, the first user 102 (message sender) then selects a geographic location at which the intended second user 104 (intended message receiver) must enter, typically within a prescribed radius as described above, as a pre-condition for receiving the location dependent short text message. Selection of the geographic location may be performed in a number of ways. In particular, one way for the first user 102 to select a geographic location is by accessing the location or bookmark directories (see step 202). Another way for the first user 102 to select a geographic location is by entering appropriate GPS co-ordinates into the first user's GPS-enabled cellular phone 102a. Another way for the first user 102 to select a geographic location may is by accessing a map display of the type commonly used in commercially available vehicle navigation systems or offered by mapping services such as Map-Quest™ or Google™. The map could show the current location of the user's GPS-enabled cellular phone device 102a superimposed on a map. One example of a mapping service is the Sprint Family Location service, the details of which may be found at (https://sfl.sprintpcs.com/finder-sprint-family/). Yet another way to specify a delivery location is through the entry of an address, which server 110 may use to identify the selected geographical location. Yet another way to specify a delivery location is by accessing data, optionally stored in a database 130 at the server 110 (see FIG. 1), corresponding to the locations of a plurality of types of locations, such as, for example, "gas stations" and/or "bars" and/or "restaurants". The various locations may be organized in a directory/sub-directory format by category whereby the general directory comprises a list of location sub-categories, such as "gas stations" and "restaurants" and each sub-category is comprised of one or more retail center locations. In the case where the first user 102 already knows the name of the particular retail center, the name can be entered directly to determine location information without having to parse through the directory format. The location of each retail center or may be represented in the database 130 by any such identifying means, including local street address, city, township, county, state, country, zip-code, telephone area-code, telephone prefix, zone or region, and the like. Alternatively, the user may also be provided with the option of selecting one of the categories or sub-categories as generalized location for sending a text message. By way of example, a user may elect to send a text message to recipients that enter within a prescribed area of all "shopping malls". Then, whenever an intended recipient enters any one of the plurality of "shopping malls" represented in the database 130, a text message is sent.

In addition to specifying at least one geographic location, the first user 102 may optionally specify additional qualifying criteria, such as, a start time and an expiration time during which the location dependent message will be transmitted to the second user 104 upon entering within a prescribed radius of the selected geographic location. For example, the first user 102 may elect to send a location dependent short text message to his spouse when he or she arrives at their home 112, contingent upon the spouse arriving at home between the hours of 5 and 6 PM.

At step 210, the location dependent message is sent to the central server 106 for validation. In one embodiment, validation comprises the central server managing entity 110 validating the specified geographic location and whether or not delivery and confirmation is approved to the second user 104. Optionally, in the case where the location dependent short text message is approved at the central server 106, a confirmation message may be sent back to the first user 102 confirming that the message is in queue at the central server 106 for eventual delivery to the intended recipient 104. In another embodiment, the step of validation may be omitted.

At step 212, the central server 106 periodically polls the user selected geographic location to determine if the intended recipient 104 has entered the specified location.

At step 214, upon determining at the central server 106 that the intended recipient 104 has entered the specified geographic location, the location dependent message is transmitted to the intended recipient 104 upon entry. Optionally, at step 216, a confirmation of transmission and/or receipt of the message is sent to the transmitting user, provided that users are mutually confirmed.

In accordance with one exemplary, non-commercial embodiment, the user 102 is provided with the option of submitting location dependent messages to be submitted in accordance with three specific message types. Specifically, according to a first message type, a first user (message sender) may submit and send location dependent messages to a single message recipient 104 of the user's own choosing. Secondly, according to a second message type, the first user 102 may submit and send location dependent messages to a group of recipients of the their own choosing. One example of the afore-mentioned first message type is a husband electing to send a location dependent message to his wife (a single intended recipient) upon entering the supermarket 116. An example of the second message type is a husband electing to send a location dependent message to his wife and children (multiple intended recipients) upon entering their home 112.

In accordance with a third message type, the user may submit general messages posted to everyone in the general broadcast network. Delivery of these messages could be dictated by the managing entity 110 per the preferences of users that have elected to receive or query the network for such general messages. This third message type constitutes network property and become part of the public domain. In contrast to this third, public domain message type, the first and second message types constitute private message types.

One example of the third message type may be a band playing at a local bar interested in promoting an upcoming live appearance. One optional pre-requisite to allowing delivery of this type of message is that it is first approved by the central server management entity 110 for appropriateness of content. Specifically, delivery of the third message type is appropriately screened at the central server 106 by the management entity 110 for content and helpfulness to ensure that the results of searches performed by receiving parties, who are unknown to the sender or originator of the message, are relevant and that the system 100 is not misused. These public domain messages (e.g., band appearance information) delivered to these unknown recipients may be selected for delivery based upon the particular preferences of the recipients (e.g., live music) and become the property of a central server managing entity 110.

In an embodiment of the present invention, it is contemplated to use the location dependent text messages as a means of alerting users when one or more contacts of the user arrives within a certain geographic proximity of the user. In contrast with the previously described embodiments, which require the identification of a prescribed geographic area for sending a location dependent message (e.g., store, home, library), the present embodiment defines a proximity based short text messaging methodology in which a short text message is transmitted from a user to a contact of the user based on the user's geographic proximity to the contact. For example, a user, e.g., Fred, may be alerted whenever one of his contacts, e.g., Alissa, happens to be within a 5-mile radius of Fred. Notification of the arrival of a contact within the prescribed geographic proximity of the user may be made dependent upon a pre-approval process, as agreed to by all participating users. Approval may include, for example, approving an intended message recipient and a time at which a message may be sent.

In a related embodiment to that described immediately above, it is contemplated to use the proximity-based text messaging methodology as a means of facilitating a networking service. The present embodiment is similar to that described above with regard to sending short text messages based on a user's relative proximity to a user contact. In contrast with the previous embodiment, however, it is assumed that the user is communicating or intending to communicate with another user that he or she does not know. As a pre-requisite, it is assumed that each user has opted to receive text messages from either the unknown parties. In accordance with this embodiment, whenever two participating users are determined to be within a prescribed geographic proximity of each other, the user's respective profiles are analyzed to determine if there are any aspects that match. If one or more aspects are determined to be a match, a proximity based short text message is transmitted.

One variation of the embodiment described immediately above is to pre-analyze matching aspects between respective users. This profile information is saved on each of the user respective mobile devices such that when two users are within a certain geographical proximity the profile information is referenced to determine whether the two users are sufficiently matched to warrant sending a message in real time. This is a desirable feature in that the profile matching may be performed off-line to save time when two users come within a certain geographical proximity.

In accordance with the present embodiment, personal profiles of registered users may be obtained by requesting that the users fill out an on-line survey similar to those offered by online dating services. Alternatively, in lieu of filling out a survey, the users may simply "opt-in" to receive these proximity based text messages as part of their membership with a particular online dating service. They may, for example, select desired characteristics of an individual they would like to meet as well as other parameters such as a time when they would like the system to search for matching users within their geographic area (e.g., evenings, weekends). For example, the users may only want to receive matching users information on Saturday nights. The user is provided the further option of turning the feature on/off at the user's discretion. For example, the feature may be turned on while the user is situated in a particular geographic location to search for matching users. To accommodate this on/off feature, the user profile is preferably stored in a memory of the mobile cellular device and may be recalled whenever the feature is enabled. A reply communication might be sent to the searching user with information about the individuals as well as further contact information such as a phone number. Care would be taken to ensure the privacy of individuals and that only relevant data that the user wants to share is shared at times in which they are looking to be matched with other users that fit their criteria.

In one exemplary commercial embodiment, a potential customer having a cellular phone may elect to receive commercial offers via short text messages on their cellular phone.

It is contemplated in this embodiment to allow a potential customer to receive general broadcast messages directed to commercial offers in one of two ways. First, the potential customer may choose to search the general broadcast messages for particular message types (e.g. restaurant reviews, theater shows). Alternatively, a potential customer may elect to receive the general broadcast messages in accordance with a pre-qualification (e.g., survey). If a customer chooses the latter method, the customer fills out a general survey by logging onto a website. The potential customer may elect to participate in the survey as broadly or narrowly as desired. For example, the customer may decide to receive commercial short text messages, for example, only for a particular day of the week, one particular weekend, just Saturday nights, or perhaps whenever they are within a particular geographic area.

The potential customer's willingness to fill out the survey provides the system with an increased capacity for qualifying "deals" with local businesses producing the commercial short text messages. That is, the profile data obtained from the survey may be used to construct pre-qualified offers, which are transmitted in a short text message that fit the individual's preferences and geography. The commercial short text messages may be delivered either when they are posted or at a pre-scheduled time. Messages may also be delivered individually or grouped. In one embodiment, grouped message offers may be sent in a framed format, for example, as a group of sample itineraries for a weekday evening for a particular city. This type of group offering may present an attractive means of assisting people in planning their activities.

Referring again to FIG. 1, the system 100 maintains a database 130 of offers within a particular geographic area. The messages are available to all registered users who happen to enter the prescribed area and are transmitted to only those registered users who have elected to receive offers (hereinafter registered participants) and whose interests match with the offers. It should be appreciated that a registered participant may elect to reverse his or her decision to receive or not receive offers at any point in time. In other words, the registered participant may opt-in or opt-out of receiving messages at the participant's discretion. It is further noted that in the case where a registered participant does not elect to receive offers (i.e., the registered participant elects to opt-out), the registered participant retains the option of searching an area for existing messages.

To prevent redundancy, the system 100 may track those offers to which a registered participant has already responded. This may be achieved, in one way, by the registered participant providing feedback to the system 100 confirming their participation. Alternately, the system 100 might analyze the types of offers to which the registered participant requests more information and provide additional offers of that type to the registered participant, deducing that the registered participant is interested in such offers.

For those individuals that elect to use the system 100 as a means of planning activities for a period of time, for example, a weekend trip to a city with which the individual is not familiar, the individual would provide feedback to system 100 for example through a survey. This survey might be administered during vacation planning either online or with a travel agent. By way of example only, a survey may include one or more questions aimed at assessing preferences regarding the following items:

1. Budget

2. Average age range

3. Type of "scene" (Artsy? Hipsters? Yuppy?)

4. Good for parents with kids?

5. Reviews/Ratings (Zagats/Movie Reviews/Etc)

6. Food:

a. Ethnicity b. Price-Fixed?

c. Decor d. Wine List e. Ratings f. Price Range g. Kid's menu?

7. Willingness to travel out of the geography

8. Favored ambiance

9. Distance from Starbucks

10. Distance from Mass transit station

11. Nearness to other scheduled events

12. Acceptance of credit cards

13. Number of individuals accompanying individual

14. Movies a. Genre b. Major or non-major release

15. Performing arts a. Dance?

b. Music? What kind?

c. Live entertainment?

d. Art showing?

e. Carnival/Fair?

f. Rides?

g. Preferred performance venue?

16. Valet parking?

17. Other network user reviews?

18. Other users confirmed attendance?

19. Discounted price?

20. Weather forecast

21. Dress code

In another embodiment, it is also contemplated to utilize the system 100 as a means of planning regularly re-occurring activities, for example, every weekend. In such an embodiment, for those individuals utilizing the system 100 on a regularly re-occurring basis, the above-described survey would provide the system 100 with a default personal profile of a user's preferences. Additional follow up surveys may be periodically sent to individuals via email or text message to further refine the default personal profile. Alternatively, individuals may refine their default user profile by logging-on to a website to provide some form of feedback on their activities and the quality of suggestions made by the system 100. Over time, the information accumulated from the multiple accumulated surveys of an individual may then be used to construct a refined personal profile of the individual thus providing a more meaningful insight into the individual's preferences and dislikes as compared with a single default personal profile for making recommendations for a single event. In this manner, the information accumulated over time enables the system 100 to select future activities and suggest offers that more closely fit the individual's personal preferences.

While a default profile of preferences per individual would be established per the above-described survey, it should be understood that personal preferences might not only vary between individuals but may vary for a particular individual over time. Thus, in response to the individual's request for assistance, the system 100 may take into account this time varying preference by contacting the individual, by email or SMS, prior to the point in time for which assistance is requested, to request that the individual answer particular questions to provide the system 100 with a sense of the individual's current preferences and mood. For example, to ascertain the individual's current preferences, the individual may be prompted with a question, such as, "What kind of mood are you in?" The question may include a multiple-choice response which further assists the individual to determine their current mood, such as, for example, (a) thrifty, (b) raucous, (c) boring. The individual's response would affect the types of events to be recommended. In the case where the individual does not respond to the survey, the system 100 may rely instead on a combination of any previously completed surveys, past activities, current weather and geography.

Once an individual receives a message including his or her recommended activities or available activities within a prescribed area, the individual is able to interact with the system 100 in various ways. For example, the individual has the option of (1) broadening the search radius to include or exclude certain areas, (2) search one or more databases 140 at the central server 106 under control of the central server management entity 110 for existing events, (3) reply directly through the message to request additional information and/or be connected with a representative of the establishment to book tickets, make reservations or otherwise secure their place at an event. For example, it is contemplated that a direct reply through the message to request additional information (i.e., a direct communication) includes an individual connected to a business entity via a mobile device one-button (i.e., "push-to-talk") device feature.

In one embodiment, it is contemplated to allow recipients of the general messages to click through the text and optionally reply for more information. Replies received from responders to the general messages are preferably stored at the central server 106. At some point, the replies are analyzed at the central server 106 to create "reference data" defining the degree of audience response to particular commercial message offers and other statistics in order to support pricing of the media. This "reference data" may be used to create a market for bidding for recipients where demonstrated responsiveness, illustrated by the statistical data, is used as a means of pricing future messages. For example, a restaurant may be interested in bidding on a general block of message recipients who exhibited certain responsiveness to a commercial offer of a discounted meal to counteract slumping midweek traffic.

In one embodiment, the market for bidding for recipients of particular types of commercial short text messages may made available to local businesses through an Internet portal, whereby local businesses are able to purchase blocks of outgoing messages and/or responses, at variable rates. For example, given an exemplary participating text messaging client base of 5000 users, assume that historical data indicates that some fixed percentage of the client base, e.g., 1000, have expressed interest in a particular product or service. The management entity, marketing the text messaging service, would price future responses in accordance with the historical data. For example, a business may be offered the chance to purchase text messages sent to the 1000 or so respondents, who have expressed a prior interest in the product or service at a premium rate (e.g., $100 per 1000 responses) and be able to purchase text messages sent to 4000 respondents, who have not expressed a prior interest in the product or service at a more nominal rate (e.g., $50 per 4000 responses). As a further option, the business entity may elect to not pay an up front block message rate fee (cost per thousand), but rather pay a fixed pre-determined amount (e.g., $1) for each message response to their advertisement (cost per inquiry). Such pricing schemes are well-known in the art.

The reader will recognize that purchasing blocks of messages, by the local business establishments, constitutes a desirable access to potential customers who have exhibited a certain responsiveness to the commercial short text messages. The central server management entity 110 acts as a broker connecting buyers (i.e., potential customers) with sellers (i.e., local businesses). A key benefit afforded to local retailers is the unique ability to interact with potential customers in near real-time by offering discounts or promotions based on the specific business needs of the day. Businesses may be put in direct contact with potential customers through the online portal, where they could discount offers dynamically based on the instantaneous needs and availabilities of the business. In cases where a price is agreed upon through a text message communication, the cell phone record of the communication acts as effective proof of the agreed-upon price-point or special deal.

In one embodiment of the present invention, it is contemplated to utilize billboards or other locations in a particular geographic location whereby text messages are broadcast by a business entity to any individual that has elected to receive text messages and comes within a certain distance of the billboard or other location.

In an embodiment of the present invention, it is contemplated to utilize location dependent messaging for the purpose of conducting contests and thus driving store traffic and encouraging usage of the system. For example, a potential player may receive one or more clues by either viewing the clue on the web site, or receiving the clue via his or her cell phone by use of text messaging or on the radio. The player then solves the clue to determine the geographic location to race to in order to win a prize, where upon arrival they receive location dependent text message indicating whether they were one of the first to arrive or otherwise races to the determined location to receive further clues in the potential attainment of the prize. The further clues being directed to locating other pre-determined geographic locations with only a particular geographic location being associated with the prize. The player will realize that he or she has arrived at the wrong geographic location by receiving the location dependent message at that site.

In an embodiment of the present invention, it is contemplated to utilize location dependent messaging for the purpose of distributing discounts and thereby increasing store traffic. For example, in an exemplary promotional campaign, the promotion rules may dictate that the first 500 people that arrive at a pre-determined geographic location receive a free sample product (e.g., ice cream, yoghurt, baseball cap, tee-shirt). Upon arrival at a pre-determined location, the first 500 people receive a text message informing them that they have qualified to receive the promotional prize along with additional instructions. As a further example, the campaign sponsors may decide that the first 200-300 people to arrive at a pre-determined location (e.g., retail outlet, public park) will receive a location dependent short text message indicating that they are eligible to receive 10% off of a product or service. Notable benefits of providing incentives to potential customers via short text messaging include, driving store traffic and encouraging users to sign up to participate in the network to receive such text messages.

In an embodiment of the present invention, it is contemplated to use the location dependent text messages as a means of alerting users when one or more contacts of the user arrives within a certain geographic proximity of the user. In contrast with the previously described embodiments, which require the identification of a prescribed geographic area for sending a location dependent message (e.g., store, home, library), the present embodiment defines a proximity based short text messaging methodology in which a short text message is transmitted from a user to a contact of the user based on the user's geographic proximity to the contact. For example, a user, e.g., Fred, may be alerted whenever one of his contacts, e.g., Alissa, happens to be within a 5-mile radius of Fred. Notification of the arrival of a contact within the prescribed geographic proximity of the user may be made dependent upon a pre-approval process, as agreed to by all participating users. Approval may include, for example, approving an intended message recipient and a time at which a message may be sent.

In a related embodiment to that described immediately above, it is contemplated to use the proximity based text messaging methodology as a means of facilitating a networking service. The present embodiment is similar to that described above with regard to sending short text messages based on a user's relative proximity to a user contact. In contrast with the previous embodiment, however, it is assumed that the user is communicating or intending to communicate with another user that he or she does not know. As a pre-requisite, it is assumed that each user has opted to receive text messages from either the unknown parties. In accordance with this embodiment, whenever two participating users are determined to be within a prescribed geographic proximity of each other, the user's respective profiles are analyzed to determine if there are any aspects that match. If one or more aspects are determined to be a match, a proximity based short text message is transmitted.

In accordance with the present embodiment, personal profiles of registered users may be obtained by requesting that the users fill out an on-line survey similar to those offered by online dating services. Alternatively, in lieu of filling out a survey, the users may simply "opt-in" to receive these proximity based text messages as part of their membership with a particular online dating service. They may, for example, select desired characteristics of an individual they would like to meet as well as other parameters such as a time when they would like the system to search for matching users within their geographic area (e.g., evenings, weekends). For example, the users may only want to receive matching users information on Saturday nights. The user is provided the further option of turning the feature on/off at the user's discretion. For example, the feature may be turned on while the user is situated in a particular geographic location to search for matching users. To accommodate this on/off feature, the user profile is preferably stored in a memory of the mobile cellular device and may be recalled whenever the feature is enabled. A reply communication might be sent to the searching user with information about the individuals as well as further contact information such as a phone number. Care would be taken to ensure the privacy of individuals and that only relevant data that the user wants to share is shared at times in which they are looking to be matched with other users that fit their criteria.

In one embodiment, it is contemplated to provide a service for receiving commercial broadcast messages to registered users whose mobile device do not provide capabilities for allowing the mobile device's location to be determined. Presently, certain mobile devices do not provide capabilities for identifying their location such as, for example, GPS, assisted GPS, RF triangulation of the signal from the cell sites serving the mobile device or by other means. This shortcoming is overcome in accordance with a method of operation, according to the present embodiment, in which a registered user, without location determination capabilities, defines at least one geographic location (e.g., home, school), during a pre-operational stage, at which he/she wishes to receive commercial broadcast messages, irrespective of the user's presence. Thereafter, in operation, a broadcast entity configured to transmit a wide spectrum of commercial broadcast messages, analyzes the various message types to identify and select those commercial broadcast message whose message type satisfy a user's profile criteria. These selected messages are transmitted to those pre-defined geographic locations. It is appreciated that the user's presence is not required as a prerequisite for sending the message to the pre-defined geographic location(s). In other words, the user's presence is not a pre-condition for broadcasting messages to the user pre-specified geographic location(s).

While the invention has been described with respect to particular embodiments, it is not thus limited. Numerous changes and improvements within the scope of the invention will now be apparent to the reader.

What is claimed is:

1. A method for promoting offered products and services from a plurality of product providers/services to a plurality of mobile device users operating mobile devices having location determination capabilities, the method comprising:
   I. during a registration stage:
      registering said plurality of mobile device users at a central server, wherein said registration comprises:
      (i) said mobile device users providing personal profile data to enable the creation and selection of commercial offers by providers of products and services for distribution to those mobile device users interested in receiving such offers,
      (ii) said mobile device users electing to receive broadcast messages including commercial offers from said providers of products and services on said mobile device user's mobile devices upon entering a pre-scribed region,
   II. during an operational stage:
      a) selecting said prescribed region by at least one product/service provider desiring to transmit a broadcast message including a commercial offer of the at least one product/service provider, wherein said prescribed region is defined as a prescribed distance from a geographic location selected by the product/service provider,
      b) periodically polling said prescribed region from the central server located outside of said prescribed region, to determine if one of said registered mobile device users has entered said region,
      c) transmitting said broadcast message from the central server situated outside of said region to a plurality of mobile device users who enter said region and who have elected to receive broadcast messages including commercial offers from said product/service providers,
      d) monitoring at the central server, responses to the transmitted broadcast message including said commercial offer from those mobile device users responding to the transmitted broadcast message, thereby allowing for a more refined understanding of the responding users personal preferences
      e) storing the monitored responses to the transmitted broadcast message, received at the central server in a data repository communicatively coupled to the central server, and
      f) using said stored responses to create more refined commercial offers from product/service providers.

2. The method of claim 1, further comprising storing the monitored responses in a data repository at the central server.

3. The method of claim 1, further comprising a user analyzing the at least one general broadcast message to identify a preferred message type.

4. The method of claim 1, further comprising the user indicating a desire to participate in the reception of the at least one general broadcast message prior to said transmitting step.

5. The method of claim 4, wherein the user indication of a desire to participate in the reception of the receiving the at least one general broadcast message is provided in accordance with a registration process performed prior to said transmitting step.

6. The method of claim 5, wherein a registered user receives the at least one general broadcast message in dependence upon one or more pre-conditions selected from the group comprising: receiving the at least one general broadcast message at particular times of the day, receiving the at least one general broadcast message on particular days of the week, and receiving the at least one general broadcast message upon the user entering the at least one prescribed geographic location.

7. The method of claim 5, wherein said registration process further comprises collecting profile information about the registered user.

8. The method of claim 7, further comprising the step of periodically transmitting supplementary user surveys to the registered user to supplement the profile information collected during registration.

9. The method of claim 8, wherein the initial and supplemental profile information is used to qualify business relationships with providers of said products and services.

10. The method of claim 1, wherein said monitoring step further comprises:
    generating reference data from said monitored responses to define a response level from a plurality of registered users to the at least one general broadcast message,
    establishing pricing criteria directed to sales rates for transmitting future general text messages based on said generated reference data, and
    utilizing said pricing criteria to establish a market directed to the promotion of future sales of general broadcast messages to said providers of said offered products and services.

11. The method of claim 9, wherein said established market makes available said established pricing criteria to said providers of said offered products and services over a network.

12. The method of claim 10, wherein said network is selected from the group comprising: the Internet, and a local area network (LAN).

13. A computer readable medium having program instructions stored thereto for implementing the method claimed in claim 1 when executed in a digital processing device.

14. A method for promoting offered products and services to a plurality of mobile device users, the method comprising:
    registering said plurality of mobile device users at a central server, wherein said registration comprises:

receiving personal profile data from said mobile device users to enable the creation and selection of commercial offers by providers of products and services for distribution to those mobile device users interested in receiving such offers, electing by said mobile device users to receive broadcast messages including commercial offers from said providers of products and services on said mobile device user's mobile devices upon entering a prescribed region, selecting said prescribed region by at least one product/service provider desiring to transmit a broadcast message including a commercial offer of the at least one product/service provider, wherein said prescribed region is defined as a prescribed distance from a geographic location selected by the product/service provider, periodically polling from the central server, said region to determine if one of said registered mobile device users has entered said region, wherein said central server is located outside of said region, transmitting said broadcast message from the central server situated outside of said region to a plurality of mobile device users who enter said region and who have elected to receive broadcast messages including commercial offers from product/service providers, monitoring at the central server, responses to the transmitted broadcast message including said commercial offer from those mobile device users responding to the transmitted broadcast message, thereby allowing for a more refined understanding of the responding users personal preferences, and storing the responses to the transmitted broadcast message, received at the central server, in a data repository communicatively coupled to the central server, and using said stored responses to create more refined commercial offers from product/service providers.

15. The method of claim 14, further comprising means for storing the monitored responses in a data repository at the central server.

16. The method of claim 14, further comprising a user analyzing the at least one general broadcast message to identify a preferred message type.

17. The method of claim 14, further comprising the user indicating a desire to participate in the reception of the at least one general broadcast message prior to said means for transmitting step.

18. The method of claim 17, wherein the user indication of a desire to participate in the reception of the receiving the at least one general broadcast message is provided in accordance with a registration process performed prior to said means for transmitting step.

19. The method of claim 18, wherein a registered user receives the at least one general broadcast message in dependence upon one or more pre-conditions selected from the group comprising: receiving the at least one general broadcast message at particular times of the day, receiving the at least one general broadcast message on particular days of the week, and receiving the at least one general broadcast message upon the user entering a pre-defined geographic location.

20. A system for promoting offered products and/or services to a plurality of mobile device users, the system comprising: a central server, configured to:

receive information from a product/service provider including at least a prescribed region over which the product/service provider desires to transmit a broadcast message including a commercial offer of the at least one product/service provider, wherein said prescribed region is defined as a prescribed distance from a geographic location selected by the product/service provider, periodically poll said prescribed region to determine if a registered mobile device user has entered said prescribed region, wherein said central server is located outside of said prescribed region, transmitting said broadcast message to a plurality of mobile device users who enter said prescribed region and who have elected to receive broadcast messages including commercial offers from product/service providers, monitor responses to the transmitted broadcast message including said commercial offer from those mobile device users responding to the transmitted broadcast message, thereby allowing for a more refined understanding of the responding users personal preferences store the monitored responses to the transmitted broadcast message in a data repository communicatively coupled to the central server, and use said stored responses to create more refined commercial offers from the product/service providers.

* * * * *